United States Patent [19]

Ruppert et al.

[11] Patent Number: 5,665,139
[45] Date of Patent: Sep. 9, 1997

[54] MOLD FOR PRODUCTION OF A QUARTZ GLASS COMPONENT

[75] Inventors: Klaus Ruppert, Maintal; Uwe Christiansen; Klaus Dittmer, both of Gelnhausen, all of Germany

[73] Assignee: Heraeus Quarzglas GmbH, Hanau, Germany

[21] Appl. No.: 538,583

[22] Filed: Oct. 3, 1995

[30] Foreign Application Priority Data

Oct. 27, 1994 [DE] Germany .................... 44 38 134.4

[51] Int. Cl.[6] ...................... C03B 9/00; C03B 11/00
[52] U.S. Cl. .................. 65/357; 65/360; 249/152; 249/164; 249/167
[58] Field of Search ........................ 249/163, 164, 249/167, 152; 65/357–360

[56] References Cited

U.S. PATENT DOCUMENTS

| | | |
|---|---|---|
| 1,398,412 | 6/1921 | Barkschat . |
| 2,831,231 | 4/1958 | Toensing . |
| 3,163,908 | 1/1965 | Lawmaster . |
| 3,797,986 | 3/1974 | Onder .................... 425/352 |
| 4,002,317 | 1/1977 | Fischer .................... 249/79 |
| 5,139,404 | 8/1992 | Grau . |

Primary Examiner—Donald E. Czaja
Assistant Examiner—Jacqueline A. Ruller
Attorney, Agent, or Firm—Felfe & Lynch

[57] ABSTRACT

The mold wall forms the boundary of a cavity provided with a filling opening and is divided vertically into several segments, which are connected to each other in such a way that they can separate under the action of a force acting outward from the cavity. At least one pretensioned elastic element is installed outside the cavity, which is in effective contact with at least one segment, so that, because of the pretension, an elastic force acts on the segment in the direction toward the cavity. A tensioning element is provided to pretension the elastic element, this tensioning element being installed outside the mold wall to serve as an abutment for the elastic element, and that the elastic element be made of a creep-resistant material.

7 Claims, 1 Drawing Sheet

5,665,139

1

MOLD FOR PRODUCTION OF A QUARTZ GLASS COMPONENT

BACKGROUND OF THE INVENTION

The invention pertains to a mold for the production of a component of quartz glass or high-silica glass. The mold has a bottom and a mold wall, consisting of a material with a coefficient of thermal expansion greater than that of quartz glass. This wall forms the boundary of a cavity provided with a fill opening and is divided vertically into several segments, which are connected to each other in such a way that they can separate under the action of a force acting outward from the cavity. The mold also has a pretensioned elastic element installed outside the cavity, this element being in effective contact with at least one segment so that, as a result of the pretension, an elastic force acts on the segment in the direction toward the cavity.

A mold of this type is known from FR-PS 1,352,564. Here a cylindrical graphite mold is described, which has a bottom, on which a sleeve-like mold wall is placed. The mold wall is divided lengthwise into several segments, which are connected detachably to each other. The longitudinal edges of the individual segments are designed to form lap joints, so that the individual segments, when placed next to each other, form a mold wall, which, although closed, still has a certain resilience with respect to forces acting from the interior of the mold toward the outside. The bottom of the mold is designed with a vertically upward-projecting collar, which extends outside and around the mold wall. On the opposite end of the sleeve-like mold, the individual segments are held together by a retaining ring, which is also provided with a vertically oriented collar, extending outside and around the mold wall. The individual segments of the mold wall are also held together by corrugated spring rings made of molybdenum wire bent into serpentine shape, which are stretched around the outside circumference of the mold wall. The coefficient of thermal expansion of quartz glass is much smaller than that of graphite. When cooled from high temperatures, the graphite mold therefore shrinks onto the quartz component which has been produced. It is possible for the graphite mold or the quartz glass component to break during this shrinking phase. The purpose of dividing the mold wall into segments is to take advantage of the resilience of the lap joints in the outward direction so that the individual segments are able to give way when the graphite mold shrinks onto the glass and so that the mold is therefore unable to trans- mit any forces to the quartz glass component.

To produce a quartz glass component, the mold is usually filled with quartz crystal grains and then heated. When molybdenum is heated to temperatures above 1,100° C., however, it reacts with carbon and becomes, in effect, case-hardened. As this process continues, the corrugated molybdenum rings lose their elasticity. Their pretension decreases, and they start to slide down along the outside wall of the mold. The individual segments of the mold wall are then held together only by the ring-shaped collars at the two ends of the mold. The time at which the corrugated rings loose their pretension to this extent cannot be predicted precisely. Upon further heating, the viscosity of the quartz glass decreases progressively, so that glass melt now intrudes between the resilient lap joints between the individual segments and can even emerge to the outside. The cooling of the mold and of the quartz glass melt proceeds inward from the outside wall. The quartz glass which has intruded into the lap joints solidifies first. Because of the quartz glass which has intruded into the joints and solidified there, however, it is no longer certain that the lap joints between the individual segments will be sufficiently resilient. The graphite mold can therefore shrink onto the quartz glass component, and the forces which thus arise can lead to the breakage of the mold or of the glass.

SUMMARY OF THE INVENTION

The invention provides a simple mold for the production of a component of quartz glass, in which the segmented mold wall is kept reliably together throughout the entire high-temperature phase and in which the component to be produced is exposed reproducibly to a defined maximum force.

This is accomplished by installing a tensioning element outside the mold wall to serve as an abutment for the elastic element so that the elastic element can be pretensioned and by making the elastic element out of a material with resistance to creep. The high-temperature phase of the process for producing the component comprises a heat-up step, a melting step, and a cooling step. The mold wall can consist either partially or completely of graphite or of some other material which is stable at high temperatures. During the heat-up step, the volume of the mold expands to a greater extent than the volume of the quartz glass or quartz glass starting material loaded into the mold. Therefore, no forces associated with a difference between the coefficients of thermal expansion are able to act on the mold wall or on the quartz glass. Temperatures of 1,500° C. or more are required to melt quartz glass. During this phase, the weight of the column of softening glass begins to act increasingly on the mold wall. These forces are directed outward from the cavity of the mold. They therefore act in opposition to the elastic force. During the conventional hold times, which can be in the neighborhood of several hours, the elastic element of creep-resistant material undergoes only a small amount of stress relaxation at these temperatures. Its pretension therefore remains essentially intact throughout the entire high-temperature phase. As a result, it is guaranteed that the individual segments of the mold are held together during the melting step, which means that no melt can emerge between the segments of the mold. The pretension of the elastic element should be strong enough to prevent the static pressure exerted by the column of quartz glass melt on the mold wall from causing the segments to gap apart. During the cooling step, the mold wall shrinks more than the quartz glass melt or the quartz glass component produced from it. As the component continues to solidify during cooling, forces develop which also act from the inside on the mold wall and opposite the elastic forces of the elastic element. The segments are designed in such a way that they can come apart from each other under the action of forces acting outward from the cavity as the size of the cavity increases. The effective pretension of the elastic element, however, initially prevents the segments from separating, but the pretension can be adjusted in such a way that, as cooling continues, the segments give way toward the outside in the direction opposite the elastic force of the elastic element. As a result of the pretension of the elastic element, the maximum forces acting on the quartz glass component produced are predetermined.

A tensioning element which is installed outside the mold wall and which serves as an abutment for the elastic element makes it possible, first, to make the elastic element as a molded part of simple design. For example, flexible molded parts such as rings, ovals, polygons, or simple strips can be provided between the mold wall and the tensioning element.

A compressive or flexural stress is impressed on the molded part in question to produce the desired pretension. The degree of pretension on elastic elements of the same type depends on the arrangement of the tensioning element with respect to the mold wall. It does not, however, depend on the concrete outside dimensions of the mold, as is the case with the known graphite mold. The tensioning element is therefore also suitable, independently of the outside dimensions of the mold and of the elastic element itself, to apply a defined pretension to the elastic element and to change this pretension.

An embodiment in which the tensioning element is a tensioning body extending around, and a certain distance away from, the mold wall has been found to be especially advantageous. This body can simultaneously serve as an abutment for several elastic elements. For example, it has been found that a surrounding tensioning body designed in the form of a ring, on the inside surface of which the elastic element rests or is attached, gives good results. When several elastic elements are used, it is especially favorable to distribute them around the tensioning ring in such a way that the elastic forces of the individual elastic elements cancel each other out. As a result, the tensioning ring becomes self-centering.

An especially suitable material for the elastic element is carbon fiber-reinforced graphite (CFC). Carbon fiber-reinforced graphite is characterized by high creep resistance. The elastic elements made from it show only a slight degree of stress relaxation after the normal holding times of several hours at temperatures of 1,500° C. or more. The pretension under which they are put therefore remains essentially intact throughout the entire high-temperature phase. In addition, CFC is available in high purities and releases only a small amount of impurities to the quartz glass melt. An elastic element in the form of a leaf spring has been found to give especially good results. A leaf spring can be easily produced even from brittle materials such as CFC. It is also easy to work with. Pretension in the form of, for example, a bending stress, can be easily impressed upon it. In a preferred embodiment, the ends of several of these pretensioned leaf springs rest against the inside surface of a tensioning ring, each spring resembling the chord of a segment of a circle. The ends of adjacent leaf springs butt up against each other. When arranged in this way, one next to the other, the leaf springs form a closed polygon inside the tensioning ring when seen from above, i.e., looking down onto the tensioning ring. It is advantageous for the polygon to have an even number of vertices, so that the elastic forces of two opposing leaf springs can cancel each other out in pairs and thus center the tensioning ring.

An embodiment is preferred in which a spacer is provided between the mold wall and the elastic element to transmit the elastic force to the segment. The spacer makes it possible to make the mold in such a way that the elastic elements themselves do not rest against the mold wall. This can be advantageous, for example, in cases where the material of which the elastic elements are made reacts with the material of the mold wall at high temperatures. The spacers also facilitate the adjustment of the pretension of the elastic elements. For example, the elastic elements do not have to push directly on the delicate segments of the mold wall; instead, they can push on the spacers.

It has been found advantageous to provide several elastic elements, each one assigned to only a single segment. By the use of several elastic elements, it is possible to distribute the total elastic force acting on the mold wall uniformly around its periphery. Because each elastic element is assigned to a specific segment, a defined elastic force acting on this specific segment can be easily predetermined. This is also true even when each segment is in effective contact with two or more elastic elements. In the case of a hollow cylindrical mold wall, these elastic elements can be arranged, for example, in a common plane perpendicular to the axis of the hollow cylinder. An embodiment with several elastic elements in a plane for each segment also offers the advantage that, in the event that one of the elastic elements breaks, the remaining elastic element or elements can partially take over the function of the broken one.

A mold in which several tensioning devices are distributed over the height of the mold wall has been found to be especially reliable. In this way, it is possible to achieve a suitable distribution of the elastic forces acting on the mold wall over the height of the mold in a simple and reproducible manner. Again, an embodiment is preferred in which each elastic element is assigned to one specific segment.

Especially with respect to the reliability of the mold, it has been found advantageous for the mold wall and the bottom to be designed in such a way that the segments are free to move in the direction of a force acting outward from the cavity, opposite the elastic force. The free outward mobility of the segments, limited only by the counteracting elastic force but not by the design of the bottom of the mold, ensures that, when the mold wall shrinks, there are no excessive forces which can act on the quartz glass component even in the lower part of the mold, near the bottom.

In an advantageous embodiment of the mold according to the invention, the mold wall is designed as a hollow cylinder and is divided into at least two segments, with abutting longitudinal edges, each segment being in effective contact in a plane extending perpendicularly to the longitudinal axis of the hollow cylinder with two elastic elements held by a tensioning ring. Depending on how tall the mold wall is, several tensioning rings parallel to each other and several elastic elements can be necessary to ensure a suitable distribution of the elastic forces, including their distribution over the height of the mold.

DETAILED DESCRIPTION OF THE PREFERRED EMBODIMENT

Figure 1:
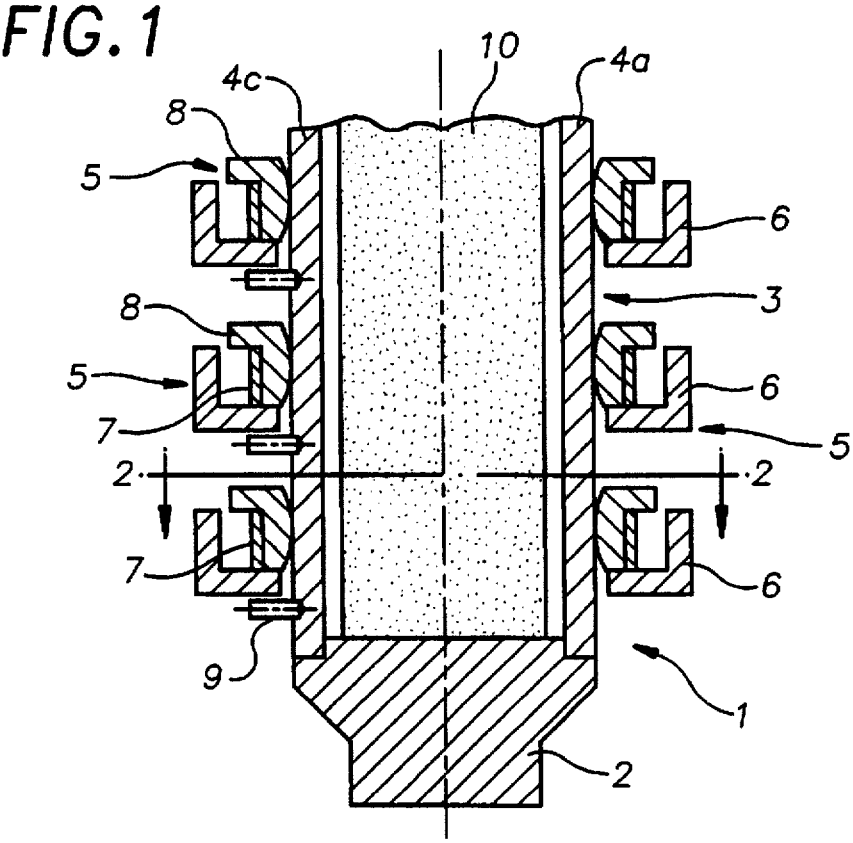
FIG. 1 shows a longitudinal cross section through a part of the mold according to the invention.

In FIG. 1, the mold includes a graphite bottom 2, on which a sleeve-like mold wall 3 of highly pure graphite is placed. Mold wall 3 is divided vertically into three arc-shaped segments 4a, 4b, 4c (see FIG. 2), the vertical edges of which butt together. In the preferred embodiment, the vertical edges are profiled with portions which overlap to form lap joints which remain in contact under radial force. A tensioning device 5 is provided around the outside wall of mold wall 3; this device is assembled from a tensioning ring 6 of graphite, leaf springs 7 of carbon fiber-reinforced graphite, and spacers 8, also made of graphite. Leaf springs 7 are supported in the pretensioned state by spacers 8 against the outside wall of mold wall 3, so that the elastic force of leaf springs 7 acts to hold mold wall 3 together. As will be understood from the figures, the term "leaf spring", as used herein, refers to a flexible leaf-like element. Tensioning ring 6 is a tubular member which serves as an abutment for leaf springs 7. In the embodiment according to the patent drawing, a total of six leaf springs 7 is provided in each tensioning device 5, the springs being arranged around the inside surface of tensioning ring 6 in such a way that the ends of the various leaf springs 7 butt up against each other. In the continuous sequence in which they are arranged, leaf springs 7 form a closed hexagon inside the tensioning ring. The elastic force of pretensioned leaf springs 7 is transmitted by way of spacers 8 to the outside surface of segments 4a, 4b, 4c. As can be seen from FIG. 2, two leaf springs 7 and their associated spacers 8 are provided inside each tensioning device 5 for each of segments 4a, 4b, 4c. Several tensioning devices 5 are distributed over the height of mold wall 3. Tensioning devices 5 are prevented from slipping by graphite pins 9, which are uniformly distributed around the periphery of mold wall 3.

Figure 2:
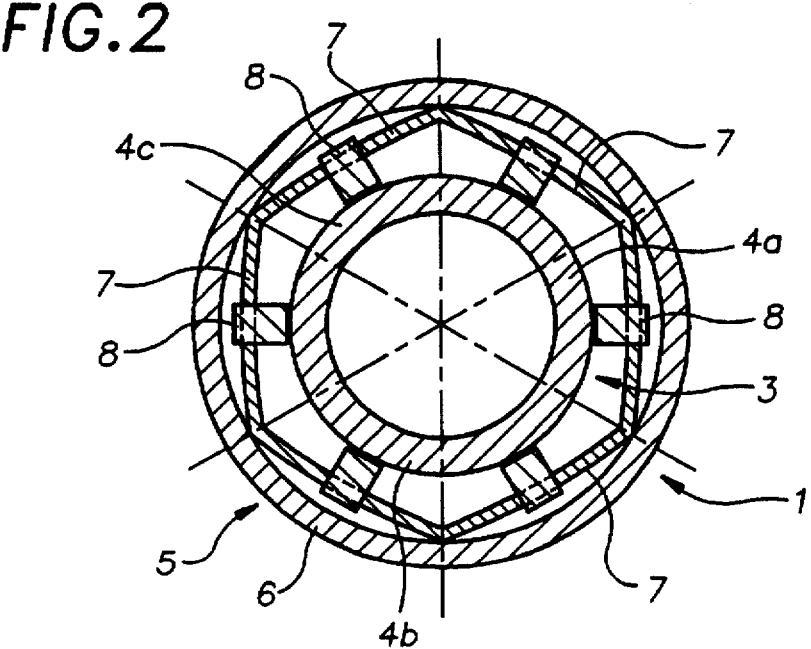
FIG. 2 shows a view of the mold according to FIG. 1 from above at the level of line A—A.

In the following, a process for the production of a component of quartz glass is explained in greater detail on the basis of FIGS. 1 and 2. A quartz glass cylinder 10 to be reformed is introduced into mold 1. Mold 1 is heated to the reforming temperature to soften quartz glass cylinder 10. The softening quartz glass comes to rest against the inside wall of mold 3, so that the column of softening quartz glass 10 exerts pressure from the inside on this wall, a pressure which increases with the duration of the melting step. The elastic forces acting on the outside wall of mold wall 3 as a result of the tensioning devices 5 compensate for these forces acting from the interior, however, with the result that mold wall 3 is prevented from opening up along the longitudinal edges of segments 4a, 4b, 4c.

As the melt or the quartz glass component produced from it cools, the difference between the coefficient of thermal expansion of the quartz glass and that of graphite, however, generates powerful forces. These are not fully compensated by tensioning devices 5, so that, under the transverse expansion of mold wall 3, freely mobile segments 4a, 4b, 4c move in the direction opposite that of the elastic forces acting on them from the outside. After mold 1 has fully cooled, leaf springs 7 can be relaxed by the removal of spacer blocks 8. After tensioning rings 6 have been removed, segments 4a, 4b, 4c can also be easily taken off, so that the reformed quartz glass cylinder can be removed.

What is claimed is:

1. Mold for the production of a quartz glass component by melting, said mold comprising:

a bottom, a sidewall upstanding from said bottom and enclosing a cavity with an open top, said sidewall having a circumference, said sidewall comprising a plurality of segments each having vertical edges which abut vertical edges of adjacent segments, whereby said segments can separate under the action of outward radial forces from within the cavity, pretensioned elastic means surrounding said wall segments, said elastic means beings resistant to creep at the melting temperature of the quartz, and tensioning means outside said sidewall and abutting said elastic means to put said elastic means under tension; said tensioning means surrounding said elastic means and being spaced from said sidewall about the entire circumference of said sidewall.

2. Mold as in claim 1 wherein said tensioning means is carbon reinforced graphite.

3. Mold as in claim 1 wherein said elastic means comprises a plurality of leaf springs.

4. Mold as in claim comprising at least one leaf spring for each wall segment.

5. Mold as in claim 1 further comprising a spacer between said sidewall and said elastic means.

6. Mold as in claim 1 comprising a plurality of said elastic means surrounding said wall segments at different heights and a plurality of said tensioning means for putting said elastic means under tension.

7. Mold as in claim 1 wherein said sidewall is formed as a hollow cylinder, said vertical edges being profiled to form lap joints which remain in contact under radial force.

\* \* \* \* \*

UNITED STATES PATENT AND TRADEMARK OFFICE
CERTIFICATE OF CORRECTION

PATENT NO. : 5,665,139
DATED : September 9, 1997
INVENTOR(S) : Ruppert, et. al.

It is certified that error appears in the above-identified patent and that said Letters Patent is hereby corrected as shown below:

Claim 4, column 6, line 27, after "claim" insert --3--.

Signed and Sealed this

Seventh Day of March, 2000

Attest:

Attesting Officer

Q. TODD DICKINSON

Commissioner of Patents and Trademarks